(12) United States Patent
Jordan et al.

(10) Patent No.: US 6,522,795 B1
(45) Date of Patent: Feb. 18, 2003

(54) TUNABLE ETCHED GRATING FOR WDM OPTICAL COMMUNICATION SYSTEMS

(76) Inventors: Rebecca Jordan, 52 Cooper La., Millington, NJ (US) 07946; Christi Kay Madsen, 436 Joan St., South Plainfield, NJ (US) 07080

( * ) Notice: Subject to any disclaimer, the term of this patent is extended or adjusted under 35 U.S.C. 154(b) by 0 days.

(21) Appl. No.: 09/573,988

(22) Filed: May 17, 2000

(51) Int. Cl.⁷ .............................. G02B 6/34; G02F 1/295
(52) U.S. Cl. ........................................ 385/10; 385/37
(58) Field of Search ................................ 385/8–10, 16, 385/18, 24, 31, 32, 37, 39, 40, 42; 359/124, 127, 128, 130

(56) References Cited

U.S. PATENT DOCUMENTS

| | | | |
|---|---|---|---|
| 5,859,941 A | * | 1/1999 | Horita et al. ................. 359/127 |
| 6,201,909 B1 | * | 3/2001 | Kewitsch et al. ............ 318/268 |
| 6,236,773 B1 | * | 5/2001 | Butler et al. .................. 385/14 |
| 6,259,847 B1 | * | 7/2001 | Lenz et al. ................... 359/130 |

OTHER PUBLICATIONS

Park et al., "Fabrication of Wavelength–Tunable INGaAsP/InP Grating–Assisted Codirectional Coupler Filter with Very Narrow Bandwidth", Apr. 24, 1997, Electronics Letters, vol. 33, Issue 9, pp. 773–774.*

* cited by examiner

Primary Examiner—Akm E. Ullah
Assistant Examiner—Michelle R. Connelly-Cushwa

(57) ABSTRACT

In accordance with the present invention, a waveguide grating comprises a core and a first cladding material adjacent the core. The first cladding is configured, as by etching, to provide a periodic grating, and a second cladding material having a controllable refractive index overlies the first cladding material. If the index of the second cladding is different from that of the first cladding, the configuration of the first cladding provides an optical grating. If, however, the controllable index of the second cladding is adjusted to equal that of the first cladding, the grating becomes essentially transparent. This grating is particularly useful as a reconfigurable add/drop filter in a WDM optical communication system. It is also useful in grating-assisted couplers and variable optical delay lines.

17 Claims, 4 Drawing Sheets

TUNABLE ETCHED GRATING FOR WDM OPTICAL COMMUNICATION SYSTEMS

FIELD OF THE INVENTION

This invention relates to optical waveguide gratings and, in particular, to etched waveguide gratings particularly useful in add/drop filters, grating-assisted couplers and variable delay lines for optical communication systems.

BACKGROUND OF THE INVENTION

Optical gratings are important elements for selectively controlling specific wavelengths of light within optical communication systems. Such gratings include Bragg gratings and long period gratings. A grating typically comprises a body of material and a plurality of substantially equally spaced optical grating elements such as index perturbations, slits or grooves.

A typical Bragg grating comprises a length of optical waveguide, including a plurality of perturbations in the index of refraction substantially equally spaced along the waveguide length. These perturbations selectively reflect light of wavelength $\lambda$ equal to twice the spacing $\Lambda$ between successive perturbations times the effective refractive index, i.e. $\lambda = 2n_{eff}\Lambda$, where $\lambda$ is the vacuum wavelength and $n_{eff}$ is the effective refractive index of the fundamental mode. The remaining wavelengths pass essentially unimpeded. Such Bragg gratings have found use in a variety of applications including filtering, adding and dropping optical signal channels, stabilization of semiconductor lasers, reflection of fiber amplifier pump energy, and dispersion compensation.

A difficulty with conventional Bragg gratings is that they filter only a fixed wavelength. Each grating selectively reflects only light in a narrow bandwidth centered around $\lambda = 2n_{eff}\Lambda$. However in many applications, such as wavelength division multiplexing (WDM), it is desirable to have a reconfigurable grating whose wavelength response can be controllably altered.

Long-period grating devices provide wavelength dependent loss and may be used for spectral shaping. A long-period grating couples optical power between two copropagating modes with very low back reflections. A long-period grating typically comprises a length of optical waveguide wherein a plurality of refractive index perturbations are spaced along the waveguide by a periodic distance $\Lambda'$ which is large compared to the wavelength $\lambda$ of the transmitted light. In contrast with conventional Bragg gratings, long-period use a periodic spacing $\Lambda'$ which is typically at least 10 times larger than the transmitted wavelength, i.e. $\Lambda' \geq 10\lambda$. Typically $\Lambda'$ is in the range 15–1500 micrometers, and the width of a perturbation is in the range $\frac{1}{5}\Lambda'$ to $\frac{4}{5}\Lambda'$. In some applications, such as chirped gratings, the spacing $\Lambda'$ can vary along the length of the grating.

Long-period grating devices selectively remove light at specific wavelengths by mode conversion. In contrast with conventional Bragg gratings in which light is reflected and stays in the waveguide core, long-period gratings remove light without reflection, as by converting it from a guided mode to a non-guided mode. (A non-guided mode is a mode which is not confined to the core, but rather, is defined by the entire waveguide structure. Often, the non-guided is a cladding mode). The spacing $\Lambda'$ of the perturbations is chosen to shift transmitted light in the region of a selected peak wavelength $\lambda_p$ into a non-guided mode, thereby reducing in intensity a band of light centered about $\lambda_p$. Alternatively, the spacing $\Lambda'$ can be chosen to shift light from one guided mode to a second guided mode (typically a higher order mode), which is stripped off.

A shortcoming of conventional long-period gratings, however, is their limited ability to dynamically equalize gain. They filter only a fixed wavelength. Each long-period grating with a given periodicity ($\Lambda'$) selectively filters light in a narrow bandwidth centered around. $\lambda_p = (n_g - n_{ng}) \cdot \Lambda'$, where $n_g$ and $n_{ng}$ are the effective indices of the core and the cladding modes, respectively. The value of $n_g$ is dependent on the core and cladding refractive index while $n_{ng}$ is dependent on core, cladding and air indices.

Techniques have been devised for tuning gratings, and an important application of tunable gratings is in the fabrication of tunable add/drop filters in optical communication systems. Tunable filters are widely used in WDM systems to add or drop a channel at the terminals or at an intermediate point in the system. Such filters must have flat passbands and good stopband rejection. UV-photoinduced Bragg gratings written in optical fibers or planar waveguides are typically employed because of their excellent spectral characteristics. Many techniques for fabricating tunable Bragg gratings in fibers have been introduced such as temperature and stretching. When tunable filters are reconfigured in a system, the operation should be transparent to the other channels on the system, i.e. hitless reconfiguration is desirable. This is a limitation for current tunable gratings unless a switch is used to bypass the grating during the reconfiguration period. Alternatively, the grating must have a sufficiently narrow bandwidth to fit in between channels. This requires gratings with extremely good characteristics so that the grating is transparent to adjacent channels.

SUMMARY OF THE INVENTION

In accordance with the present invention, a waveguide grating comprises a core and a first cladding material adjacent the core. The first cladding is configured, as by etching, to provide a periodic grating, and a second cladding material having a controllable refractive index overlies the first cladding material. If the index of the second cladding is different from that of the first cladding, the configuration of the first cladding provides an optical grating. If, however, the controllable index of the second cladding is adjusted to equal that of the first cladding, the grating becomes essentially transparent. This grating is particularly useful as a reconfigurable add/drop filter in a WDM optical communication system. It is also useful in grating-assisted couplers and variable optical delay lines.

BRIEF DESCRIPTION OF THE DRAWINGS

The advantages, nature and various additional features of the invention will appear more fully upon consideration of the illustrative embodiment now to be described in detail. In the drawings.

It is to be understood that these drawings are for purposes of illustrating the concepts of the invention and, except for the graphs, are not to scale.

DETAILED DESCRIPTION

Figure 1:
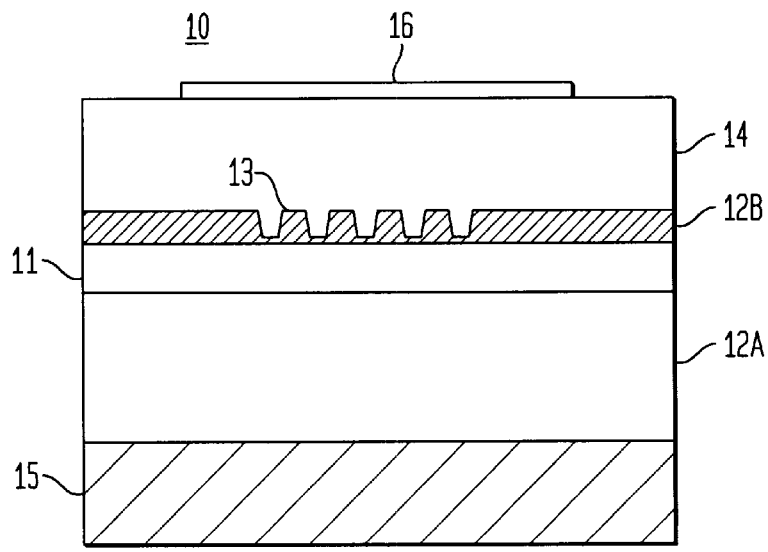
FIG. 1 is a schematic cross section of a tunable waveguide grating.

Referring to the drawings, FIG. 1 is a schematic cross section of a tunable waveguide grating 10 comprising a core 11 having an index of refraction $n_1$ peripherally surrounded by cladding layers 12A, 12B having indices of refraction e.g. $n_2$, $n_3$ less than $n_1$. A portion of one of the cladding layers 12B is configured, as by etching, to provide spatial variations forming a periodic grating 13. A second cladding 14 having an index of refraction $n_3 < n_1$ overlies the first cladding 12B and fills the grating 13. While the device can be either a planar waveguide grating or a fiber grating, in the planar waveguide form shown in FIG. 1, it is conveniently fabricated on a supporting substrate 15. The grating 13 can be a Bragg grating or a long period grating depending on the period spacing in relation to the wavelength of transmitted light.

In accordance with the invention, the claddings 12A, 12B and 14 are made of materials such that $n_2$ or $n_3$ can be independently controlled. Specifically, the device can be tuned between at least two states: 1) $n_2 \neq n_3$ and 2) $n_2 = n_3$. In the first state, $n_2 \neq n_3$, the periodic structure acts as an optical grating. In the second state, $n_2 = n_3$, the grating becomes optically transparent and has negligible effect on transmitted light.

The preferred mechanism for tuning the grating between the two states is to make one of the claddings of a material whose refractive index varies more with temperature than the other cladding. For example, the cladding 12B can be silica and the second cladding 14 can be a polymer with a more temperature sensitive refractive index. A resistance heating element 16 thermally coupled to the second cladding 14 permits the desired tuning.

Alternatively, the grating could be tuned between the two states by making one of the claddings of electrooptic or liquid crystal material and applying an electric field for control. One of the claddings can be made of semiconductor material and the injection or depletion of charges can tune the index. One of the claddings can be a magnetooptic material tuned by a magnetic field; or it can be a glass with an index tuned by strain.

The invention can now be better understood by consideration of the following specific example.

EXAMPLE

The substrate 16 can be silicon. The claddings 12A, 12B can be Ge-doped silica, and the core 11 can be formed of a higher index doped silica. The grating 13 can be defined as an etched, crenelated region within cladding 12B. The second cladding 14 can be a polymer such as a halogenated acrylate.

The refractive indices for the silica-based layers at a wavelength of 1.55 micrometers are: cladding 12A, 1.445; core 11, 1.46234, cladding 12B, 1.44512. For a Bragg grating, the grating layer is 1.1 micrometers thick with a 1.0 micrometer etch depth and a period of $\Lambda = \lambda/2n_e = 530$ nanometers where $n_e = 1.4511$ is the effective index. The polymer upper cladding has a refractive index temperature dependence of $-4 \times 10^{-4}/°C$.

Figure 2:
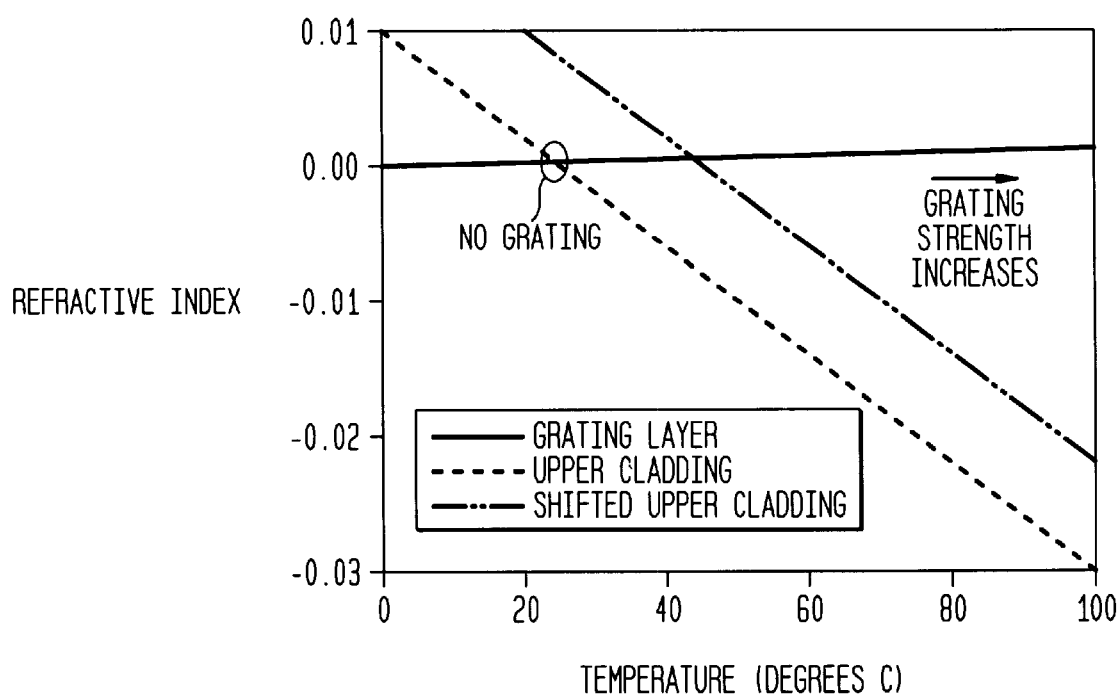
FIG. 2 is a graphical illustration of the refractive indices of components of the FIG. 1 device useful in understanding the operation of the device.

FIG. 2, which is useful in understanding the operation of the exemplary device, plots the refractive indices of the claddings as a function of temperature. When the temperature is set so that the refractive index of the polymer 14 matches that of the grating layer cladding 12B (as indicated by the circle in FIG. 2), the grating is optically transparent. As the temperature increases, the index of the polymer decreases, and the grating strength increases. For a 73° C. change in temperature, the refractive index has changed so that the grating strength is proportional to $\delta n_e/n_e = 1 \times 10^{-3}$. The reflection bandwidth is related to the grating strength by $\Delta\lambda \approx \lambda \delta n_e/n_e$, so bandwidths up to ~1 nm can be achieved with these parameters. The grating strength is therefore sufficient for filters in WDM communication systems.

Figure 3A:
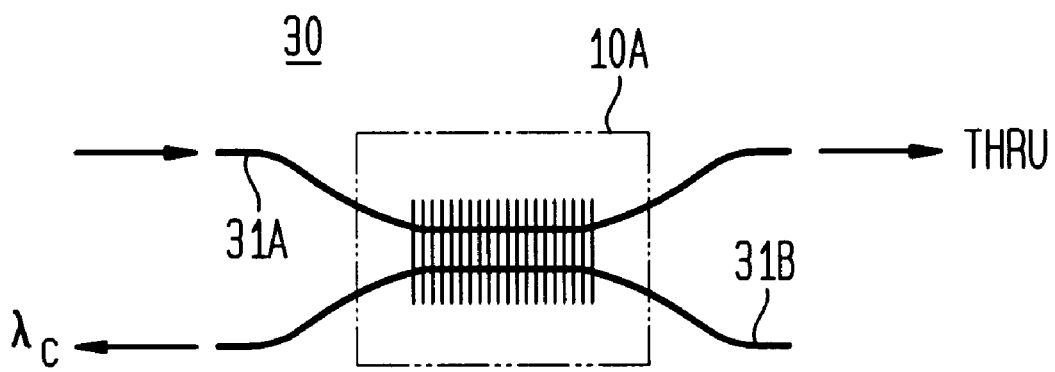
FIGS. 3A and 3B illustrate grating-assisted couplers using the tunable grating of FIG. 1.
Figure 3B:
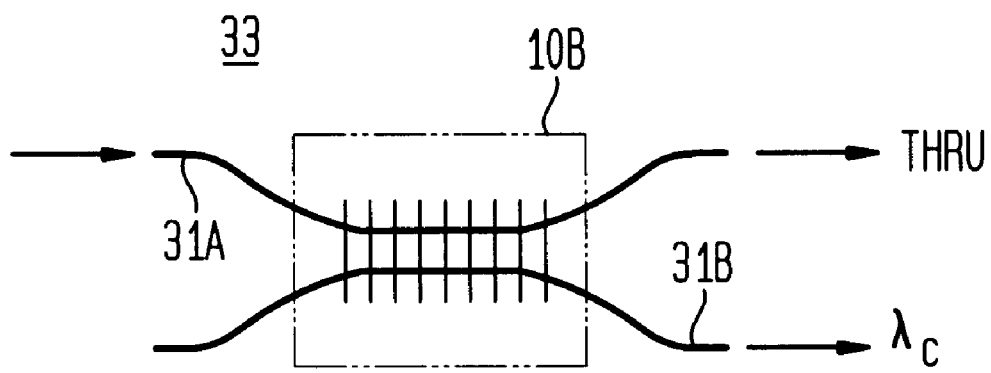

While the tunable grating of FIG. 1 is used in connection with but a single core-defined waveguide, it is also possible to use the FIG. 1 gratings with more complex waveguide structures. For example, FIGS. 3A and 3B are schematic top views showing grating assisted couplers using tunable gratings 10A, 10B. FIG. 3A shows a Bragg grating assisted coupler 30 comprising a pair of optically. coupled waveguide cores 31A and 31B having a tunable Bragg grating 10A overlying the coupling region. Output of wavelength $\lambda_c$ corresponding to the grating resonance is reflected as shown. The coupling strength can be varied by tuning the grating refractive index contrast.

FIG. 3B shows a long-period grating assisted coupler 33 comprising a pair of optically coupled waveguide cores 31A and 31B having a tunable long-period grating 10B overlying the coupling region. Output of a wavelength $\lambda_c$ corresponding to the forward-shifted mode is transmitted as shown. Again the coupling strength can be varied by tuning the cladding index contrast.

Figure 4:
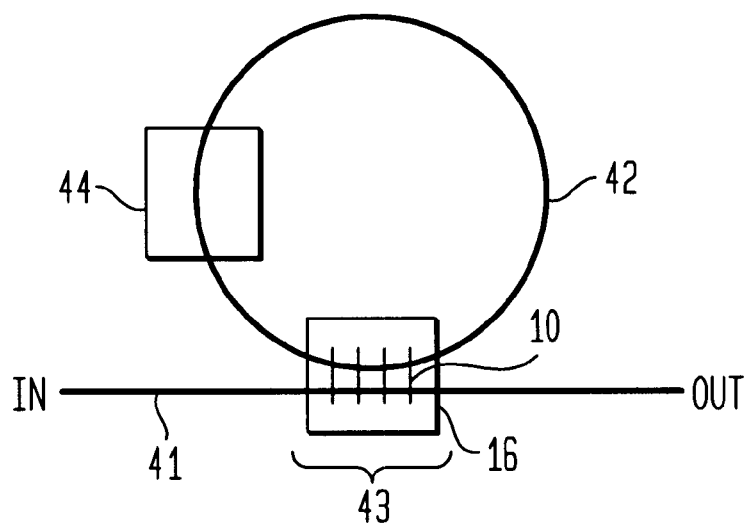
FIG. 4 schematically illustrates a tunable all-pass filter using the grating of FIG. 1.

FIG. 4 schematically illustrates a tunable all-pass filter 40 using a tunable waveguide grating 10 as described in connection with FIG. 1. The filter 40 comprises a length of waveguide 41 passing adjacent a waveguiding ring resonator 42. The waveguide 41 and ring resonator 42 are sufficiently close together in a coupling region 43 that there is overlap of the exponential tails of the light they carry. The tunable waveguide grating 10 overlies the coupling region 43. Grating 10 can be either a Bragg grating or a long-period grating. Advantageously, a phase shifter 44, such as a resistive heater, is coupled to the ring resonator 42.

In operation, the device acts as a tunable all-pass filter. If grating 10 is a Bragg grating, light from the input couples by reflection from the grating 10 clockwise around the ring 42 back to the grating 10 where it is reflected toward the output. If grating 10 is a long-period grating, the input couples forward into the ring 42. It travels counterclockwise around the ring and forward couples into the waveguide 41 toward the output.

Control of the grating 10 via its associated heater 16 permit the strength of the coupling between the waveguide and the ring. Control of the phase shifter 44 permits tuning the resonant wavelength of ring 42.

Figure 5:
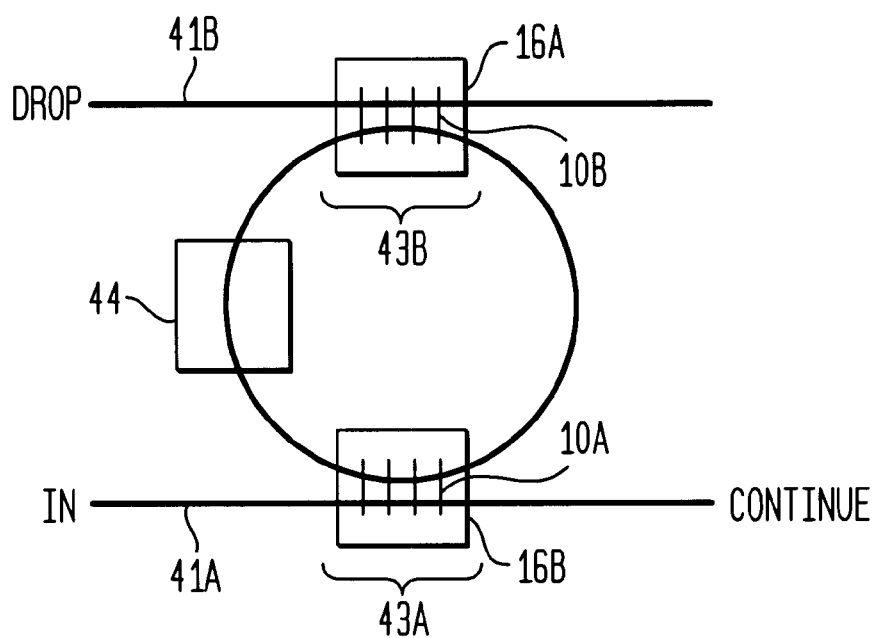
FIG. 5 schematically illustrates a tunable drop filter using the gratings of FIG. 1.

FIG. 5 schematically illustrates a tunable drop filter 50 using a pair of tunable waveguide gratings 10A and 10B as described in FIG. 1. The drop filter 50 comprises a pair of waveguides 41A and 41B passing adjacent a waveguiding ring resonator 42 at respective coupling regions 43A and 43B. Tunable waveguide gratings 10A and 10B are disposed overlying the respective coupling regions 43A, 43B. The gratings 10A and 10B can both be Bragg gratings or both be long-period gratings. Advantageously, a phase shifter 44, such as resistive heater, is coupled to the ring resonator 42.

In operation, the device acts as a tunable drop filter. If gratings 10A and 10B are both Bragg gratings tuned to a wavelength λ to be dropped, then λ from the input waveguide 41A reaching grating 10A is coupled by reflection into ring 42 in the clockwise direction. Upon reaching grating 10B, it is coupled by reflection into output waveguide 41B. If the gratings are both long-period gratings a similar result is achieved by forward coupling.

Figure 6:
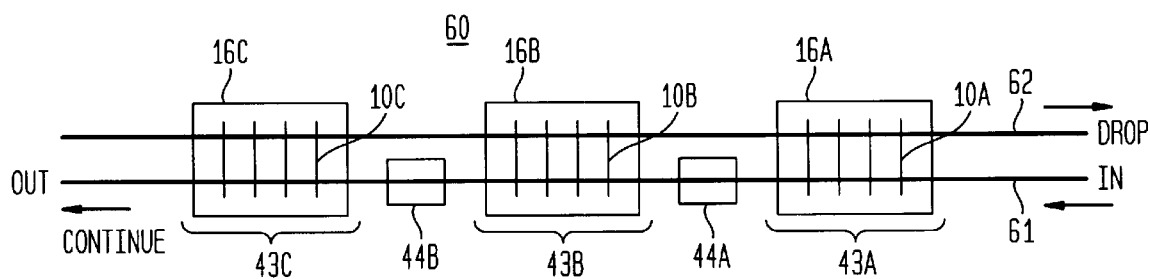
FIG. 6 illustrates an alternative drop filter using FIG. 1 gratings.

FIG. 6 schematically illustrates an. alternative drop filter 60 using a plurality of tunable waveguide gratings 10A, 10B, 10C as described in FIG. 1. The drop filter 60 comprises a pair of generally parallel waveguides 61, 62 having a plurality of coupling regions 43A, 43B, 43C. With a respective plurality of overlying gratings 10A, 10B, 10C. Advantageously, phase shifters 44A, 44B are coupled to waveguide 62 between each pair of gratings. The gratings 10A, 10B and 10C are Bragg gratings, and the waveguides 61, 62 advantageously have significantly different-effective indices of refraction (e.g. 2.0 and 1.4).

In operation, a broadband signal can enter input waveguide 61. If gratings 10A, 10B, 10C are tuned to the drop wavelength λ, then when the signal reaches a grating, the drop wavelength will be reflectively coupled into drop waveguide 62. Phase shifters 44A and 44B can tune the phase relation between the successive reflections, and the different effective indices of the waveguides minimizes back reflection. The non-dropped components on waveguide 61 continue to its output.

Figure 7:
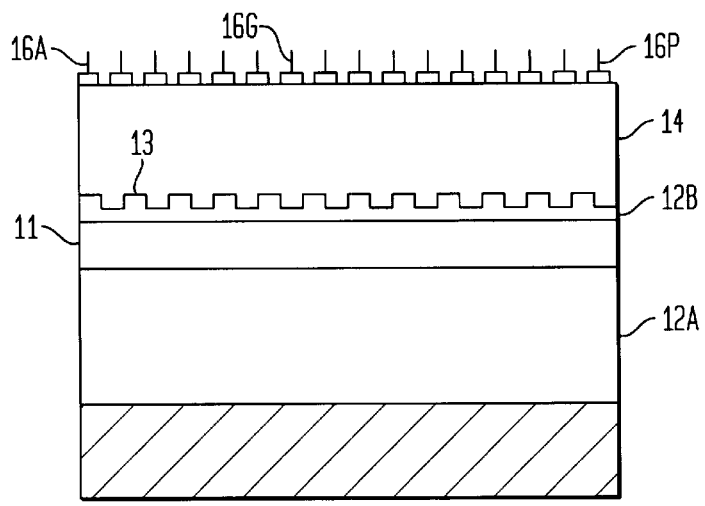
FIG. 7 illustrates a variable optical delay line using the gratings of FIG. 1.

FIG. 7 is a schematic cross section of a variable optical delay line using a variation of the FIG. 1 grating. The device of FIG. 7 is similar to the device of FIG. 1 except that instead of a single index control element overlying the grating 13, a succession of control elements 16A–16P are disposed overlying the length of the grating 13.

At the nominal temperature where the grating is transparent, the FIG. 7 device acts as a waveguide. By locally heating a section of the cladding 14, the grating appears and an incoming signal at the grating resonance is reflected. The grating can be effectively moved down the waveguide by turning off upstream heaters and turning on downstream heaters. This increases the delay experienced by the signal before reflection.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed:

1. A tunable optical grating comprising:
    an optical waveguide comprising a core region and a peripherally surrounding first cladding of a first material having an index of refraction;
    a portion of the first cladding adjacent the core region configured to provide periodic spatial variations adjacent a length of the core;
    a second cladding of a second material, different from the first material, overlying the spatial variations, the second cladding having an index of refraction which can be adjusted relative to the index of refraction of the first material; and
    a control element to reversibly adjust the index difference between the second cladding and the first cladding between a condition of inequality for presenting an optical grating to light traveling along the waveguide and a condition of equality for presenting no optical grating.

2. A tunable grating according to claim 1 wherein the first cladding comprises silica, the second cladding comprises a polymer with an index of refraction that varies with temperature, and the control element comprises a heater thermally coupled to the second cladding.

3. A tunable optical coupler comprising a pair of waveguides optically coupled along a coupling region and, overlying the coupling region, a tunable grating according to claim 1.

4. A tunable optical coupler according to claim 3 wherein the tunable grating comprises a Bragg grating.

5. A tunable optical coupler according to claim 3 wherein the tunable grating comprises a long-period grating.

6. A tunable all-pass filter comprising a length of optical waveguide coupled along a coupling region to a waveguide ring resonator and, overlying the coupling region, a tunable grating according to claim 1.

7. A tunable all-pass filter according to claim 6 further comprising a phase shifter coupled to the ring resonator.

8. A tunable all-pass filter according to claim 6 wherein the tunable grating comprises a Bragg grating.

9. A tunable all-pass filter according to claim 6 wherein the tunable grating comprises a long-period grating.

10. A tunable drop filter comprising:
    a waveguide ring resonator;
    a first waveguide passing adjacent the resonator along a first coupling region;
    a second waveguide passing adjacent the resonator along a second coupling region; and
    first and second tunable gratings according to claim 1 overlying the first and second coupling regions, respectively.

11. A tunable drop filter according to claim 10 further comprising a phase shifter coupled to the ring resonator.

12. A tunable drop filter according to claim 10 wherein the first and second tunable gratings comprise Bragg gratings.

13. A tunable drop filter according to claim 10 wherein the first and second tunable grating comprise long-period gratings.

14. A tunable drop filter comprising:
    first and second generally parallel waveguides having a plurality of optical coupling regions;
    a plurality of tunable gratings according to claim 1, each grating comprising a Bragg grating and overlying a respective optical coupling region.

15. The drop filter of claim 14 further comprising a plurality of phase shifters coupled to one of said waveguides between successive tunable gratings.

16. The drop filter of claim 14 wherein the first and second waveguides have different effective indices of refraction.

17. The tunable grating of claim 1 wherein the control element comprises a plurality of heaters thermally coupled to the second cladding along the length of the grating.

* * * * *